United States Patent
Liu et al.

(10) Patent No.: US 8,405,976 B2
(45) Date of Patent: Mar. 26, 2013

(54) HEAT DISSIPATION DEVICE AND ELECTRONIC DEVICE HAVING SAME

(75) Inventors: Lei Liu, Shenzhen (CN); Ai-Ling He, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 205 days.

(21) Appl. No.: 13/096,983

(22) Filed: Apr. 28, 2011

(65) Prior Publication Data

US 2012/0241131 A1 Sep. 27, 2012

(30) Foreign Application Priority Data

Mar. 23, 2011 (CN) .......................... 2011 1 0070728

(51) Int. Cl.
*H05K 7/20* (2006.01)
(52) U.S. Cl. ..................... 361/679.49; 361/694; 361/695
(58) Field of Classification Search ........... 361/694–695
See application file for complete search history.

(56) References Cited

U.S. PATENT DOCUMENTS

| | | | | |
|---|---|---|---|---|
| 6,504,718 B2 * | 1/2003 | Wu | ............................ | 361/695 |
| 6,535,384 B2 * | 3/2003 | Huang | ........................ | 361/695 |
| 7,209,352 B2 * | 4/2007 | Chen | .......................... | 361/695 |
| 7,361,081 B2 * | 4/2008 | Beitelmal et al. | ............ | 454/184 |
| 7,623,346 B2 * | 11/2009 | Fujiya et al. | .................. | 361/694 |
| 8,004,791 B2 * | 8/2011 | Szeremeta et al. | ......... | 360/97.21 |
| 8,077,458 B2 * | 12/2011 | Guan | ........................... | 361/695 |
| 8,295,051 B2 * | 10/2012 | Cheng | ......................... | 361/727 |
| 2002/0054479 A1 * | 5/2002 | Wu | ............................. | 361/695 |
| 2005/0030712 A1 * | 2/2005 | Faneuf et al. | ................ | 361/687 |
| 2008/0253077 A1 * | 10/2008 | Miyamoto et al. | ........... | 361/685 |
| 2008/0266790 A1 * | 10/2008 | Belady et al. | ................. | 361/695 |

* cited by examiner

*Primary Examiner* — Gregory Thompson
(74) *Attorney, Agent, or Firm* — Altis Law Group, Inc.

(57) ABSTRACT

A heat dissipation device includes a receiving body and a blower. The receiving body includes a recessed body. The recessed body includes a first sidewall, a second sidewall opposite to the first sidewall, and a bottom connecting the first sidewall to the second sidewall. The blower is arranged on the bottom. The blower includes a casing, an air supply pipeline communicating with the casing, and an air blocking plate between the casing and the air supply pipeline. Two opposite ends of the air blocking plate respectively contact with the first sidewall and the second sidewall, such that the recessed body is separated into a first recessed area and a second recessed area. The first recessed area receives the casing, and the second recessed area receives the air supply pipeline.

16 Claims, 4 Drawing Sheets

HEAT DISSIPATION DEVICE AND ELECTRONIC DEVICE HAVING SAME

CROSS-REFERENCE TO RELATED APPLICATIONS

The present application is related to a copending U.S. patent application, titled "SERVER ENCLOSURE", with the application Ser. No. 12/237,662 assigned to the same assignee as the present application, the disclosure of which is incorporated herein by reference.

BACKGROUND

1. Technical Field

The present disclosure relates to heat dissipation devices and particularly, to a heat dissipation device for dissipating heat generated by electric members and an electronic device having the heat dissipation device.

2. Description of Related Art

A typical electronic device (e.g. sever, host, etc) includes a plurality of receiving spaces for receiving a plurality of hard disk drives. Some of the receiving spaces may not be used, so a corresponding number of dummy blocks need to be inserted into the unused receiving spaces. However, the receiving spaces with the dummy blocks are wasteful, and the heat dissipation of the electronic device with the dummy blocks included is not efficient.

Therefore, what is needed is a new heat dissipation device and a electronic device using the new heat dissipation device that can overcome the described limitations.

DETAILED DESCRIPTION

Embodiments will now be described in detail below with reference to drawings.

Figure 1:
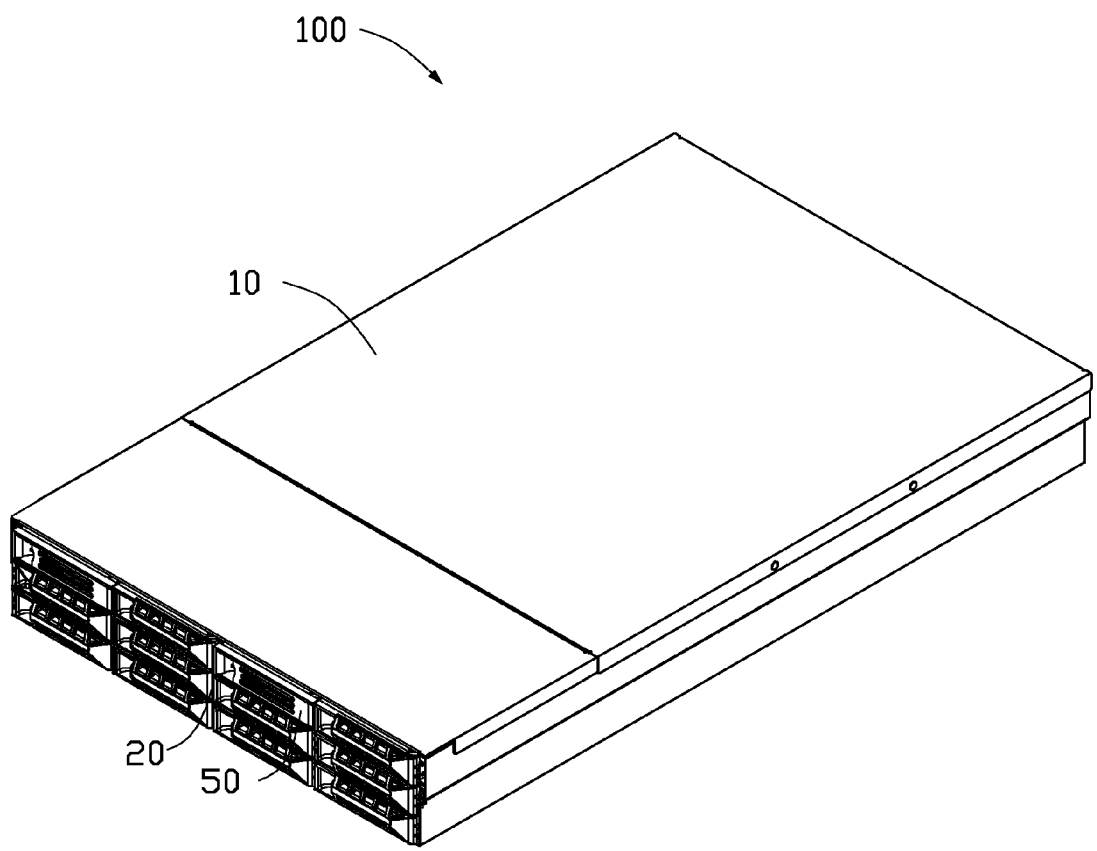
FIG. 1 is an isometric view of an electronic device according to an exemplary embodiment.

Referring to FIG. 1, an electronic device 100 includes an enclosure body 10 and a plurality of receiving spaces 20 arranged on the enclosure body 10. Each of the receiving spaces 20 is configured for receiving one of a plurality of hard disk drives (HDDs) 30 (see FIG. 4) or one of two heat dissipation devices 50. A shape of the heat dissipation device 100 may be similar to that of the HDD 30. In other embodiments, there may be one, three, or more heat dissipation devices 100 in the electronic device 100.

Figure 2:
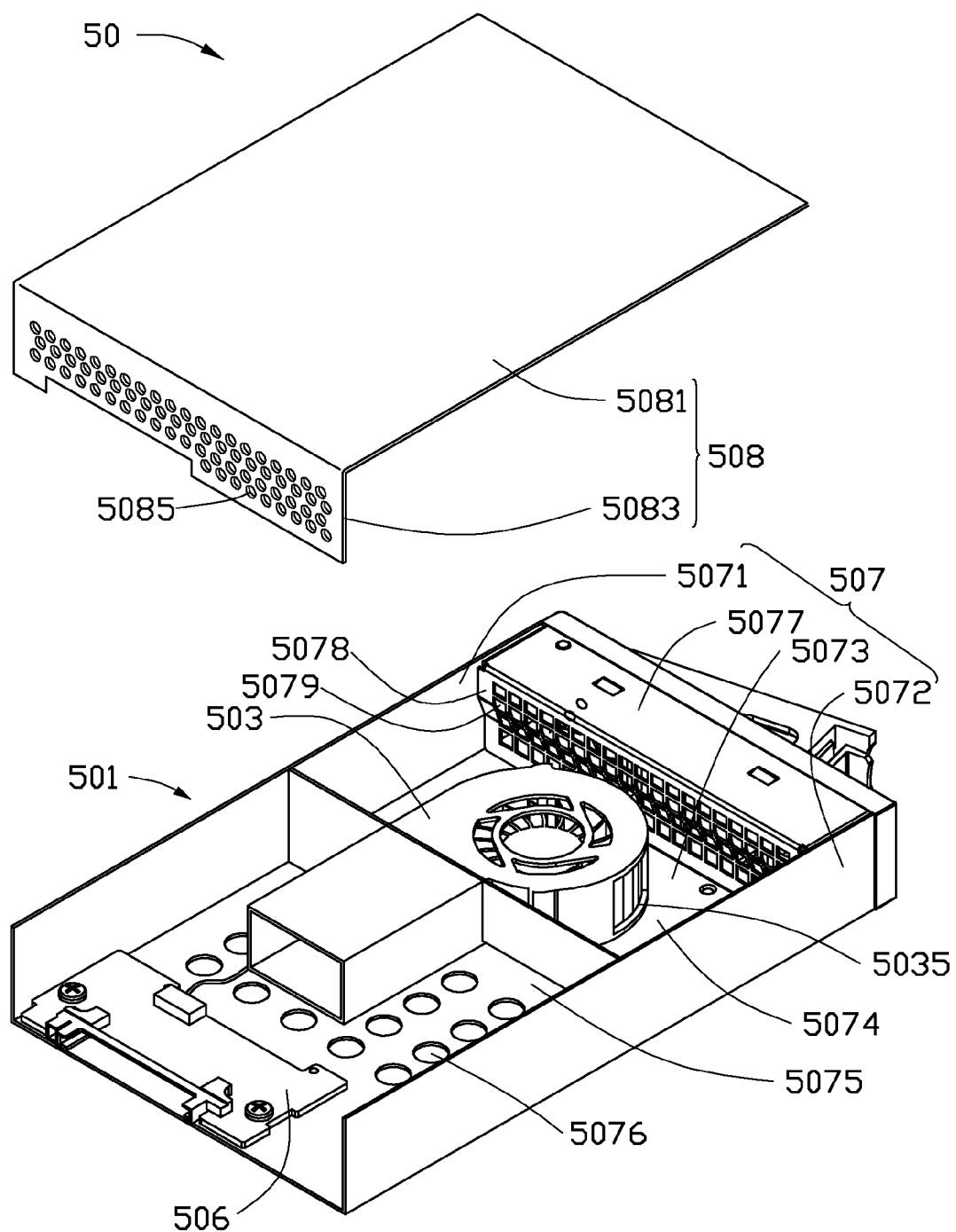
FIG. 2 is an exploded and isometric view of a heat dissipation device of the electronic device of FIG. 1.
Figure 3:
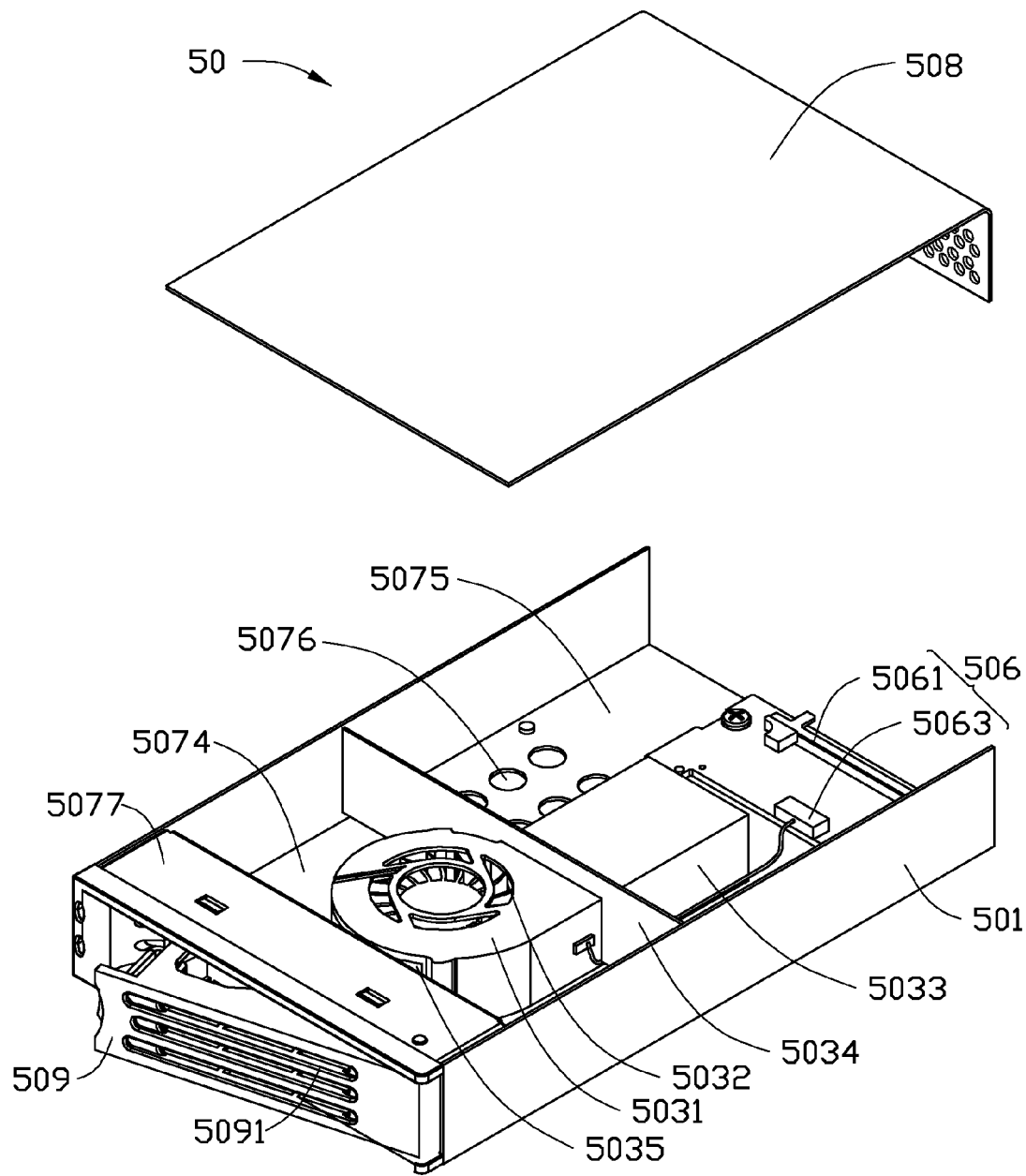
FIG. 3 is similar to FIG. 2, but viewed from another aspect.

Referring to FIGS. 2-3, each of the heat dissipation devices 50 includes a receiving body 501 received in one receiving space 20, a blower 503 received in the receiving body 501, and a circuit board 506 arranged in the receiving body 501.

The receiving body 501 includes a recessed body 507. The recessed body 507 is substantially U-shaped, and includes a first sidewall 5071, a second sidewall 5072 opposite to the first sidewall 5071, and a bottom 5073 connecting the first sidewall 5071 to the second sidewall 5073. The bottom 5073 is configured for supporting the blower 503.

The blower 503 includes a casing 5031, an air supply fan 5032 received in the casing 5031, an air supply pipeline 5033 communicating with the casing 5031, and an air blocking board 5034.

The casing 5031 is arranged on the bottom 5073, and defines a plurality of air inlets 5035 communicating with the inside of the casing 5031. Each air inlet 5035 is configured for allowing air from the outside of the casing 5031 to enter into the inside of the casing 5031. In the present embodiment, the casing 5031 is substantially round, and is fixed on the bottom 5073 with screws (not shown).

In the present embodiment, the air supply fan 5032 is arranged at the center of the casing 5031. When the air supply fan 5032 rotates, the air in the inside of the casing 5031 becomes a high speed air flow under the action of the rotation of the air supply fan 5032.

The air supply pipeline 5033 is a hollow structure. The air supply pipeline 5033 is configured for guiding the high speed air flow to move along the extending direction of the air supply pipeline 5033. In the present embodiment, the air supply pipeline 5033 is substantially cuboid. The axis of the air supply pipeline 5033 is parallel with the axis of the receiving spaces 20, such that the flowing direction of an air flow passing through the air supply pipeline 5033 is parallel with the flowing direction of an air flow passing through the HDDs 30. Accordingly, the flowing direction of the air flow in the electronic device 100 is kept uniform before and after having the heat dissipation device 50. In other embodiments, the air supply pipeline 5033 may be other shapes, such as cylindrical, pentagonal, or prismatic.

The two opposite ends of the air blocking board 5034 respectively contact with the first sidewall 5071 and the second sidewall 5072, such that the recessed body 509 is separated into two separated recessed areas (i.e. a first recessed area 5074 and a second recessed area 5075 separated from the first recessed area 5074). Accordingly, air convection between the first recessed area 5074 and the second recessed area 5075, which can influence a normal working of the blower 503, can be avoid. The first recessed area 5074 is configured for receiving the casing 5031. The second recessed area 5075 is configured for receiving the air supply pipeline 5033.

The circuit board 506 is arranged on a portion of the bottom 5073, which is in the second recessed area 5075. The circuit board 506 includes a first power connector 5061 and a second power connector 5063 electrically connected to the first power connector 5061. The first power connector 5061 is electrically connected to an HDD interface of a main board (not shown) of the electronic device 100, such that an electrical source (not shown) on the main board can be electrically connected to the first power connector 5061. The second power connector 5036 is electrically connected to the blower 503, such that the electrical source on the main board can power the blower 503. In the present embodiment, the circuit board 506 is fixed on the bottom 5073 with screws (not shown).

In the present embodiment, the portion of the bottom 5073, which is in the second recessed area 5075, defines a plurality of air openings 5076 for dissipating heat generated by other electric elements (not shown) in the second recessed area 5075. In other embodiments, the air openings 5076 may be omitted.

In the present embodiment, the recessed body 507 also includes an end wall 5077 near the casing 5031. The end wall 5077 is connected to the first sidewall 5071, the second sidewall 5072, and the bottom 5073. The end wall 5077 is substantially cuboid, and is a recessed structure. The opening of the end wall 5077 faces away from the casing 5031. The receiving body 501 also includes a handle 509 located at the opening of the end wall 5077. One end of the handle 507 is pivotally connected to the sidewall of the end wall 5077. The inner lateral face 5078 of the end wall 5077 (i.e. the recessed bottom of the end wall 5077) defines a plurality of air openings 5079 communicating with the first recessed area 5074. The handle 509 also defines a plurality of air inlets 5091 communicating with the air openings 5079.

When the receiving body 501 is inserted into the receiving space 20, the handle 509 is pressed in the end wall 5077, such that the air inlets 5091 are parallel with the air openings 5079. Accordingly, air from the outside can enter into the end wall 5077 by the air inlets 5091. When the receiving body 501 needs to be pulled out of the receiving space 20, the handle 509 can be first pulled out of the end wall 5077, such that there is an angle between the air inlets 5091 and the air openings 5079. Accordingly, the receiving body 501 can be easily pulled out of the receiving space 20 with the help of the handle 509.

In alternative embodiments, the end wall 5077 and the handle 509 may be omitted. In such cases, air from the outside can directly enter into the first recessed area 5074. In further alternative embodiments, the handle 509 may be omitted. In such cases, the user (not shown) can contact with the end wall 5077 to pull the receiving body 507 out of the receiving space 20.

In the present embodiment, for protecting the blower 503 and the circuit board 506 from contamination or impact, the receiving body 501 also includes a cover 508 engaged with the casing 507. The cover 508 is substantially L-shaped, and includes a flat plate 5081 and an extending plate 5083 perpendicularly extending from one end of the flat plate 5081. The extending plate 5083 defines a plurality of air openings 5085, such that air flow can pass through the extending plate 5083. In other embodiments, the cover 508 may be omitted.

In operation, air from the outside successively passes through the air inlets 5091, the air openings 5079 and the air inlets 5035 in that order, and enters into the casing 5079. Then, the air in the casing 5079 becomes a high speed air flow under the action of the rotation of the air supply fan 5032, and the high speed air flow enters into the inside of the electronic device 100 by the guidance of the air supply pipeline 5033. Accordingly, heat generated by other electric elements far away from the heat dissipation device 50 is dissipated.

Figure 4:
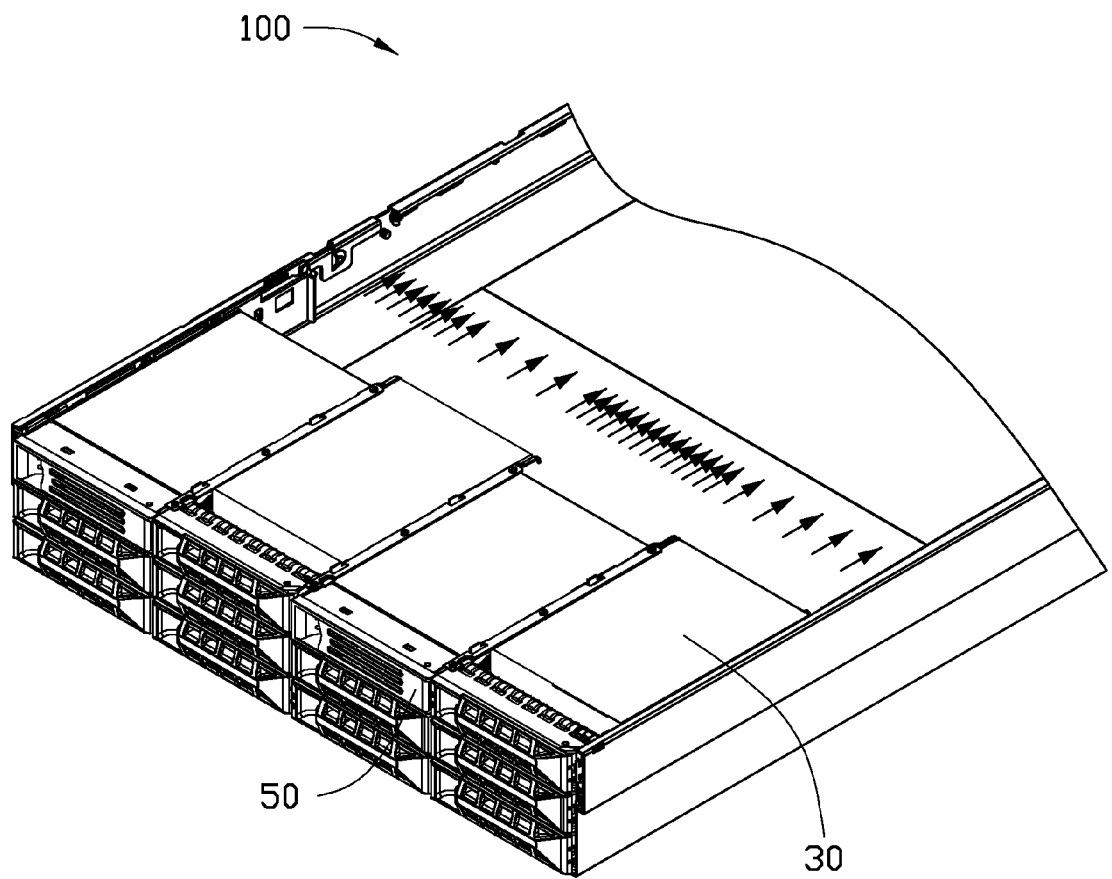
FIG. 4 is a schematic diagram showing airflow distribution of the electronic device of FIG. 1.

Referring also to FIG. 4, the electronic device 100 with the heat dissipation devices 50 not only uses the receiving spaces 40 without the HDD, but also enhances air output in the electronic device 100. Accordingly, the efficiency of heat dissipation of the electronic device 100 can be improved.

It is understood that the shape of the receiving space 20 can be designed into other shapes, and the shape of the heat dissipation device 50 can be changed with the change of the shape of receiving space 20, as long as the heat dissipation device 50 can be inserted into the receiving space 20. It is also understood that there may be two, three, or more air supply fans 5033 and an air supply pipeline 5033 in the heat dissipation device 50.

While certain embodiments have been described and exemplified above, various other embodiments will be apparent to those skilled in the art from the foregoing disclosure. The disclosure is not limited to the particular embodiments described and exemplified but is capable of considerable variation and modification without departure from the scope and spirit of the appended claims.

What is claimed is:

1. A heat dissipation device, comprising:
a receiving body, the receiving body comprising a recessed body, the recessed body comprising a first sidewall, a second sidewall opposite to the first sidewall, and a bottom connecting the first sidewall to the second sidewall, and
a blower arranged on the bottom, the blower comprising a casing, an air supply pipeline communicating with the casing, and an air blocking plate between the casing and the air supply pipeline, two opposite ends of the air blocking plate respectively contacting with the first sidewall and the second sidewall, such that the recessed body is separated into a first recessed area and a second recessed area, the first recessed area receiving the casing, and the second recessed area receiving the air supply pipeline.

2. The heat dissipation device of claim 1, wherein the bottom defines a plurality of first air openings in the second recessed area.

3. The heat dissipation device of claim 1, wherein the receiving body further comprises an end wall connected to the first sidewall, the second sidewall, and the bottom, and the end wall is positioned near the casing.

4. The heat dissipation device of claim 3, wherein the end wall is a recessed structure, and defines an opening facing away from the casing.

5. The heat dissipation device of claim 4, wherein the end wall defines a plurality of second air openings facing and communicating with the first recessed area.

6. The heat dissipation device of claim 5, further comprising a handle, one end of the handle being pivotally connected to the end wall, and the handle defining a plurality of air inlets communicating with the second air openings of the end wall.

7. The heat dissipation device of claim 1, further comprising a circuit board for supplying power to the blower.

8. The heat dissipation device of claim 7, wherein the circuit board comprises a first power connector and a second power connector electrically connected to the first power connector, the second power connector is electrically connected to the blower.

9. An electronic device, comprising:
an enclosure body defining a plurality of receiving spaces;
at least one HDD, each HDD received in a corresponding one of the receiving spaces, and
at least one heat dissipation device, each heat dissipation device received in a corresponding one of the receiving spaces, each heat dissipation device comprising:
a receiving body, the receiving body comprising a recessed body, the recessed body comprising a first sidewall, a second sidewall opposite to the first sidewall, and a bottom connecting the first sidewall to the second sidewall, and
a blower arranged on the bottom, the blower comprising a casing, an air supply pipeline communicating with the casing, and a air blocking plate between the casing and the air supply pipeline, two opposite ends of the air blocking plate respectively contacting with the first sidewall and the second sidewall, such that the recessed body is separated into a first recessed area and a second recessed area, the first recessed area receiving the casing, and the second recessed area receiving the air supply pipeline.

10. The electronic device of claim 9, wherein the bottom defines a plurality of first air openings in the second recessed area.

11. The electronic device of claim 9, wherein the receiving body further comprises an end wall connected to the first sidewall, the second sidewall, and the bottom, and the end wall is positioned near the casing.

12. The electronic device of claim 11, wherein the end wall is a recessed structure, and defines an opening facing away from the casing.

13. The electronic device of claim 12, wherein the end wall defines a plurality of second air openings facing and communicating with the first recessed area.

14. The electronic device of claim 13, further comprising a handle, one end of the handle being pivotally connected to the end wall, the handle defining a plurality of air inlets communicating with the second air openings of the end wall.

15. The electronic device of claim 9, further comprising a circuit board for supplying power to the blower.

16. The electronic device of claim 15, wherein the circuit board comprises a first power connector and a second power connector electrically connected to the first power connector, the second power connector is electrically connected to the blower.

* * * * *